United States Patent [19]
Mothes et al.

[11] Patent Number: 5,961,707
[45] Date of Patent: Oct. 5, 1999

[54] ALCOHOL-CONTAINING GRANULES

[75] Inventors: Helmut Mothes, Holzminden; Jürgen Hinderer, Leverkusen; Reinhard Boeck, Kaarst, all of Germany

[73] Assignee: Haarmann & Reimer GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/054,998

[22] Filed: Apr. 3, 1998

[30] Foreign Application Priority Data

Apr. 9, 1997 [DE] Germany .............................. 197 14 581

[51] Int. Cl.$^6$ ...................................................... C08L 3/02
[52] U.S. Cl. ..................... 106/205.7; 106/215.1; 426/96; 426/285; 426/592
[58] Field of Search .............................. 106/205.7, 215.1; 426/96, 285, 592; 127/29, 32, 33

[56] References Cited

U.S. PATENT DOCUMENTS

| | | | |
|---|---|---|---|
| 3,919,408 | 11/1975 | Mitchell et al. | 424/49 |
| 4,454,165 | 6/1984 | Sato et al. | 426/592 |
| 4,931,174 | 6/1990 | Uhlemann et al. | 209/139.1 |
| 4,946,654 | 8/1990 | Uhlemann et al. | 422/140 |
| 5,213,820 | 5/1993 | Uhlemann et al. | 425/222 |

FOREIGN PATENT DOCUMENTS

| | | |
|---|---|---|
| 163836 | 12/1985 | European Pat. Off. . |
| 332031 | 9/1989 | European Pat. Off. . |
| 332929 | 9/1989 | European Pat. Off. . |
| 2547267 A1 | 10/1975 | Germany . |
| 3214321 | 6/1983 | Germany . |
| 19500919 | 7/1996 | Germany . |
| 2 110 235 | 3/1982 | United Kingdom . |
| WO 9117821 | 11/1991 | WIPO . |
| WO 96/21722 | 1/1996 | WIPO . |

*Primary Examiner*—David Brunsman
*Attorney, Agent, or Firm*—Brinks Hofer Gilson & Lione

[57] ABSTRACT

By fluidized-bed spray granulation, dextrin granules having a high content of enclosed alcohol are obtained from dextrin/water/alcohol mixtures.

12 Claims, No Drawings

ALCOHOL-CONTAINING GRANULES

BACKGROUND OF THE INVENTION

1. Field of the Invention

The present invention relates to granules having a relatively high content of ethanol (below "alcohol") and a process for the preparation of alcohol-containing granules by fluidized-bed spray granulation.

2. Discussion of the Background

It is known that alcohol-containing instant beverage mixtures may be produced by adsorption of alcohol-containing components to non-volatile components (German Offenlegungsschrift 195 00 919). Fixing the alcohol to the surface by adsorption cannot ensure permanent encapsulation of the alcohol, which greatly restricts the handleability and leads to high alcohol losses in the unpackaged state. In particular, these powders are not free-flowing.

It is further known that alcohol-containing powders having a high alcohol content and high alcohol yield can be produced (German Patent Specification-C 32 14 321; U.S. Pat. No. 4,454,165) by spray-drying hydrolyzed starch containing at least 50% oligosaccharides having a degree of polymerization of glucose of up to 8 and containing up to 10% saccharides having a degree of polymerization of glucose of up to 2 in an alcohol-containing aqueous solution. The requirements made of the support in this process with respect to the degree of polymerization restrict the usable materials greatly, however. Moreover, the particle properties (size, structure) can only be varied in a limited manner.

SUMMARY OF THE INVENTION

The object of the invention was therefore to provide alcohol-containing granules which do not have the disadvantages described.

We have now found a process for the preparation of alcohol-containing granules by encapsulation using dextrins, which is substantially independent of the degree of polymerization of glucose of the dextrins used. Depending on requirements, porous or compact granules can be produced having a high alcohol content, with effective alcohol encapsulation and good flowability.

The process according to the invention is therefore not directed to a particular content of $G_3$–$G_6$ oligosaccharides (G represents glucose, the indices the degree of polymerization).

The invention relates to a process for the preparation of alcohol-containing granules by fluidized-bed spray granulation of a solution of dextrins in a water/alcohol mixture.

DESCRIPTION OF THE INVENTION

The term "solution" for the purposes of the invention also includes dispersions. Preferably, however, true solutions (which therefore do not include dispersions) are used.

The process according to the invention permits the use of saccharides which have virtually no alcohol-covering properties and can only be processed to give powders with difficulty using conventional methods. By this process, surprisingly, very high yields of encapsulated alcohol, based on the alcohol used, may be achieved.

The term "dextrins" is taken to mean starch, waxy starch, modified starch, modified waxy starch, preferably starch breakdown products, in particular cold-water-soluble starch breakdown products. "Modified starch" is taken to mean starches and starch breakdown products which are altered by chemical derivatization, principally esterification or etherification. "Starch breakdown products" for the purposes of the invention primarily include products obtainable by acid-catalyzed hydrolytic breakdown or by enzymatic breakdown; the enzymatic breakdown, as is known, can be performed with the use, for example, of amylases, glucoamylases or pullulanases. Preferred dextrins include starch breakdown products having a content of $G_1$–$G_2$ saccharides of greater than 10% by weight and of $G_1$–$G_8$ saccharides of less than 50% by weight. Particularly preferred dextrins are pregelatinized (cold-water-soluble) starches.

In particular, preference is given to dextrins which are soluble at a concentration of at least 40, preferably at least 50, in particular at least 60, % by weight in water at 25° C.

Mixtures of the dextrins described and cellulose or cellulose derivatives can also be used. Preferred mixtures comprise 50 to 99% by weight of hydrolyzed starch containing more than 10% by weight of saccharides of a degree of polymerization of glucose of up to 2, and 1 to 50% by weight of simple or modified starch, polysaccharides, cellulose, cellulose derivatives and/or gelatin.

The solutions to be used for the process according to the invention generally comprise 20 to 70, preferably 35 to 55,% by weight of dextrins, 10 to 40, preferably 20 to 35, % by weight of water, 10 to 40, preferably 20 to 35, % by weight of alcohol and, if appropriate 20% by weight of other components, such as wine dry matter. The term "solution" for the purposes of the invention also includes non-true solutions and dispersions.

The viscosity of the solutions to be used for the process according to the invention depends on the necessity of the mechanical atomization provided for the process; it is generally 100 to 200, preferably 140 to 170, mPa.s/30° C. and a shear rate of 981 1/min.

The solutions are spray-granulated in a fluidized bed with constant agitation. In the course of the fluidized-bed spray granulation, particles situated in a fluidized bed which are substantially smaller than the granules to be produced are sprayed with an atomizable starting material and dried until the particles have reached the desired particle size.

A suitable process for the fluidized-bed spray granulation and a device for this process are disclosed, for example, by EP-A 163 836; U.S. Pat. No. (4,946,654) device of this type essentially consists of a fluidized-bed granulator which contains apparatuses for spraying the product fed in a sprayable form, which, in addition, contains a system suitable for recycling fine fractions escaping from the fluidized bed and to the gas-distributor plate of which, one or more counter-current gravity classifiers are directly attached.

Granules having a narrow particle size distribution may be produced by a) spraying the product to be granulated in liquid form into a fluidized bed, b) separating off the fine fractions escaping from the fluidized bed together with the exhaust gas and recycling them to the fluidized bed as seeds for granule formation, c) solely by setting the classifying gas flow rate, influencing the granulation process in the fluidized bed in such a manner that granules are formed in the size preset by the classifying gas flow rate, and d) taking off the finished granules alone via one or more counter-current gravity classifiers inserted into the gas-distributor plate of the fluidized-bed apparatus and e) if appropriate, subjecting the granules thus obtained to a thermal aftertreatment.

Advantageously, the process can be carried out in such a manner that the granule formation process, in the interplay between granule growth and seed formation, is inherently set to the discharged granule size predetermined by the classifying gas feed. In this case, the size of the granules can be set via the classifying discharge. These embodiments of the process are, for example, described in European Patent Specification 332 031 (U.S. Pat. No. 4,931,174) and 332 929 (U.S. Pat. No. 5,213,820). In principle, the process can also be carried out using standard granulators continuously or batchwise.

The classification can equally be performed separately and downstream using screens or other classifiers. Seed material can be produced by grinding.

The process according to the invention is generally carried out as follows: firstly, the dextrin is dissolved in water. The alcohol is added to the aqueous dextrin solution, homogenization of the solution by intensive mechanical mixing having proved to be useful. The alcohol content of the solution has an upper limit due to the alcohol-soluble critical concentration. The solution is spray-granulated in a fluidized bed (with constant agitation).

With appropriate choice of parameters, the granules forming, owing to the shell-like growth, are very compact, microporous and of uniform shape, so that they satisfy the highest requirements of abrasion resistance of granules. However, granules of high porosity can also be produced by suitable agglomeration conditions (low binder content), if agglomerates having rapid dispersion behaviour are required.

The resulting granules have an alcohol content of 2 to 40, preferably 20 to 30, % by weight and particle diameters of 0.1 to 3, preferably 0.2 to 2 mm. The width of the particle diameter distribution (90% of the weight) is generally ±500, preferably ±200, $\mu$m, based on the maximum of the (weight) distribution curve.

In addition to alcohol and starch, natural and nature-identical flavourings can also be added to the granules, in which case the flavour content is 2 to 30%, preferably 5 to 20%, based on granules.

If appropriate, the alcohol-containing granules are then coated with a support material, which further improves the alcohol encapsulation quality and also the flowability and abrasion resistance. Suitable coating materials are simple and modified starches, gelatin, cellulose and cellulose derivatives, lactose, fats, waxes and the like. The proportion of the coating material is 5 to 70, preferably 5 to 30, % by weight, based on the uncoated granules.

The alcohol-containing granules are abrasion-resistant, of low dust content and free-flowing. In contrast thereto, in spray-drying generally, solid particles are obtained in pulverulent form having elevated dust contents and markedly poorer flowability. The alcohol-containing granules produced by the process according to the invention can serve as additive for a multiplicity of pulverulent foods (for example dry soups, sauces, desserts, beverages etc.).

The percentages in the following examples are in each case by weight.

EXAMPLES

The starches characterized in Table 1 were used in these examples.

TABLE 1

Composition of the hydrolyzed starches used (figures in % by weight)

| | Degree of polymerization of glucose | | | | | | | | |
|---|---|---|---|---|---|---|---|---|---|
| Type | $G_1$ | $G_2$ | $G_3$ | $G_4$ | $G_5$ | $G_6$ | $G_7$ | $G_8$ | $G_{9-n}$ |
| A | 1.0 | 5.7 | 8.7 | 6.7 | 7.2 | 8.3 | 6.4 | 4.0 | 52.0 |
| B | 10.0 | 5.2 | 7.9 | 6.1 | 6.5 | 7.5 | 5.8 | 3.6 | 47.4 |

The symbol G signifies the glucose and the index signifies the degree of polymerization. The alcohol content of the granules is specified in the present invention in % by weight; the alcohol yield specifies the percentage proportion of the alcohol remaining in the granules, based on the amount of alcohol used in the solution employed. The alcohol content was determined by gas chromatography and the water content was determined by Karl-Fischer titration.

The use of the hydrolyzed starch A, in which the content of saccharides having a degree of polymerization of glucose of up to 2 is 6.7%, primarily serves to show that, using the process according to the invention, despite a higher content of saccharides having a degree of polymerization of glucose of 2 in the hydrolyzed starch B, the alcohol content of the granules and the alcohol retention even increase.

Example 1

In a granulation apparatus of the type shown in European Patent Specification 332 031 and EP-A 163 836 and having the following features (diameter of the gas-distributor plate: 225 mm, atomizing nozzle: two-component nozzle, classifying discharge: zig-zag classifier, filter: internal bag filter) a solution consisting of 25% by weight of water, 25% by weight of ethanol and 50% of hydrolyzed starch (B as in Table 1) is granulated. The solution is sprayed at a temperature of 30° C. into the fluidized-bed granulator. To fluidize the bed contents, nitrogen is blown in at a rate of 110 kg/h. The inlet temperture of the fluidizing gas is 105° C. The temperature of the exhaust gas is 58° C. The classifying gas fed is likewise nitrogen, at a rate of 10 kg/h at a temperature of 30° C. The contents of the fluidized bed are 800 g. The granulation rate is 3 kg per hour. Free-flowing granules having a mean particle diameter of 600 $\mu$m are obtained. The mean composition of the granules is: 29.1% ethanol, 4% water. This corresponds to an alcohol yield of 87% Alcohol and water contents remain constant over an experimental period of approximately 7 hours. On account of the constant pressure drop of the filter and the likewise constant bed contents, steady-state conditions with regard to the granulation process may be assumed.

Example 2 (Comparison)

In a pilot-plant spray tower, a spray solution which has the same composition as in Example 1 is dried at a feed air temperature of 180° C. and an exhaust air temperature of 75° C. The resulting product contains only 17% alcohol, i.e. the alcohol encapsulation, at an alcohol yield of only 52%, was only 59% of the alcohol yields achieved by fluidized-bed spray granulation. Furthermore, the product is not dust-free, has a tendency to agglomeration and is thus of poor flowability.

Example 3

In the apparatus described in Example 1, a solution consisting of 25% water, 25% ethanol and 50% hydrolyzed starch (A as in Table 1) is granulated. The solution is sprayed at a temperature of 30° C. into the fluidized-bed granulator. To fluidize the bed contents, nitrogen is blown in at a rate of 110 kg/h. The inlet temperature of the fluidizing gas is 105° C. The temperature of the exhaust gas is 58° C. The classifying gas fed is likewise nitrogen at a rate of 9 kg/h and a temperature of 30° C. The contents of the fluidized bed are 600 g. The granulation rate is 2.5 kg per hour. Free-flowing granules having a mean particle diameter of 400 $\mu$m are obtained. The mean composition of the granules is 25.4% by weight of ethanol, 4.2% of water. This corresponds to an alcohol yield of 77%. Remarkably, but at a lower content of saccharides having a degree of polymerization of glucose of up to 2 in the hydrolyzed starch used, lower alcohol contents and thus a poorer alcohol yield, in comparison with Example 1, are achieved.

Example 4

In the apparatus described in Example 1, a solution consisting of 25% water, 25% ethanol and 50% CAPSULE 1450® (starch octenyl succinate) is granulated. The solution is sprayed at a temperature of 30° C. into the fluidized-bed granulator. To fluidize the bed contents, nitrogen is blown in at a rate of 110 kg/h. The inlet temperature of the fluidizing gas is 105° C. The temperature of the exhaust gas is 52° C. The classifying gas fed is likewise nitrogen at a rate of 10 kg/h and a temperature of 30° C. The contents of the fluidized bed are 800 g. The granulation rate is 2.5 kg per hour. Free-flowing granules having a mean particle diameter of 1 mm are obtained. The mean composition of the granules is 26.8% ethanol, 2.5% water. This corresponds to an alcohol yield of 81%.

Example 5

In the apparatus described in Example 1, a solution consisting of 23.5% water, 30% natural rum flavouring (containing approximately 79% alcohol) and 46.5% hydrolyzed starch (B as in Table 1) is granulated. The solution is sprayed at a temperature of 35° C. into the fluidized-bed granulator. To fluidize the bed contents, nitrogen is blown in at a rate of 110 kg/h. The inlet temperature of the fluidizing gas is 105° C. The temperature of the exhaust gas is 52° C. The classifying gas fed is likewise nitrogen at a rate of 8.5 kg/h and a temperature of 52° C. The contents of the fluidized bed are 200 g. The granulation rate is 3.5 kg per hour. Free-flowing granules having a mean particle diameter of 400 $\mu$m are obtained. The mean alcohol content of the granules is 26.7% ethanol. This corresponds to an alcohol yield of 81%. Although virtually 30% water was present in the solution, surprisingly, high alcohol yields were achieved without change.

Example 6

In the apparatus described in Example 1, a solution consisting of 38% red wine concentrate (14.2% ethanol, 14.7% dry matter), prepared by reverse osmosis, 14% ethanol and 48% hydrolyzed starch (B as in Table 1) is granulated. The solution is sprayed at a temperature of 35° C. into the fluidized-bed granulator. To fluidize the bed contents, nitrogen is blown in at a rate of 110 kg/h. The inlet temperature of the fluidizing gas is 105° C. The temperature of the exhaust gas is 62° C. The classifying gas fed is likewise nitrogen at a rate of 8.0 kg/h and a temperature of 57° C. The contents of the fluidized bed are 450 g. The granulation rate is 2.8 kg per hour. Free-flowing granules having a mean particle diameter of 500 $\mu$m are obtained. The mean alcohol content of the granules is 24.8% ethanol. This corresponds to an alcohol yield of 70%.

Example 7

In the apparatus described in Example 1, a solution consisting of 28.3% water, 1.2% nature-identical brandy flavouring, 23.5% ethanol and 47% hydrolyzed starch (B as in Table 1) is granulated. The solution is sprayed at a temperature of 35° C. into the fluidized-bed granulator. To fluidize the bed contents, nitrogen is blown in at a rate of 110 kg/h. The inlet temperature of the fluidizing gas is 105° C. The temperature of the exhaust gas is 60° C. The classifying gas fed is likewise nitrogen at a rate of 10.0 kg/h and a temperature of 40° C. The contents of the fluidized bed are 800 g. The granulation rate is 2.9 kg per hour. Free-flowing granules having a mean particle diameter of 500 $\mu$m are obtained. The mean alcohol content of the granules is 25.1% ethanol. This corresponds to an alcohol yield of 73%.

We claim:

1. A process for preparation of alcohol-containing granules, comprising spray granulating a solution of dextrins in a water/alcohol mixture in a fluidizer bed granulator.

2. The process according to claim 1, wherein the solution of dextrins comprises 20 to 70% by weight dextrins, 10 to 40% by weight water, and 10 to 40% by weight alcohol.

3. The process of claim 2, wherein the solution of dextrins comprises 35 to 55% by weight dextrins.

4. The process of claim 2, wherein the solution of dextrins comprises 20 to 35% by weight of water.

5. The process of claim 2, wherein the solution of dextrins comprises 20 to 35% by weight of alcohol.

6. The process of claim 1, wherein the solution of dextrins further comprises up to 20% by weight of wine dry matter.

7. The process according to claim 1, wherein said process results in granules having a particular diameter of 0.1 to 3 mm.

8. The process according to claim 1, wherein said process results in granules having an alcohol content of 2 to 40% by weight.

9. The process of claim 1, wherein said spray drying is performed with mechanical atomization at 100 to 200 mPa.s/30° C. and a shear rate of about 981 L/min.

10. Dextrin granules having a content of enclosed alcohol of at least 20% by weight.

11. Dextrin granules according to claim 10, further comprising 5 to 70% by weight, based on the weight of the uncoated granules, of a coating.

12. A process comprising:
    (a) dissolving dextrin in water,
    (b) adding alcohol to the aqueous dextrin solution;
    (c) homogenizing the solution; and
    (d) spray-granulating the solution is a fluidized bed granulator with constant agitation.

* * * * *